US011613353B2

(12) United States Patent
Newman

(10) Patent No.: US 11,613,353 B2
(45) Date of Patent: Mar. 28, 2023

(54) EXPEDITED DESIGN AND QUALIFICATION OF UNMANNED AERIAL VEHICLES

(71) Applicant: The Boeing Company, Chicago, IL (US)

(72) Inventor: Daniel I Newman, Lafayette Hill, PA (US)

(73) Assignee: The Boeing Company, Arlington, VA (US)

( * ) Notice: Subject to any disclaimer, the term of this patent is extended or adjusted under 35 U.S.C. 154(b) by 895 days.

(21) Appl. No.: 16/266,581

(22) Filed: Feb. 4, 2019

(65) Prior Publication Data

US 2020/0247521 A1 Aug. 6, 2020

(51) Int. Cl.
*B64C 39/02* (2023.01)
*B64C 1/06* (2006.01)
*G05D 1/08* (2006.01)
*G06F 30/15* (2020.01)
*G06F 30/17* (2020.01)
*B64C 27/52* (2006.01)
*B64C 1/16* (2006.01)
*B64U 10/10* (2023.01)
*B64U 30/20* (2023.01)

(52) U.S. Cl.
CPC ............ *B64C 39/024* (2013.01); *B64C 1/06* (2013.01); *B64C 1/16* (2013.01); *B64C 27/52* (2013.01); *G05D 1/085* (2013.01); *G06F 30/15* (2020.01); *G06F 30/17* (2020.01); *B64U 10/10* (2023.01); *B64U 30/20* (2023.01)

(58) Field of Classification Search
CPC .... B64C 1/06; B64C 1/16; B64C 1/26; B64C 27/28; B64C 27/52; B64C 2201/108; B64C 2211/00; B64C 39/04
See application file for complete search history.

(56) References Cited

U.S. PATENT DOCUMENTS

| 8,453,962 | B2* | 6/2013 | Shaw | B64C 27/28 |
| | | | | 244/17.23 |
| 8,931,730 | B2* | 1/2015 | Wang | B64C 25/32 |
| | | | | 244/17.17 |
| 10,800,521 | B1* | 10/2020 | Grenier | B64C 29/02 |
| 2010/0108801 | A1* | 5/2010 | Olm | B64C 39/024 |
| | | | | 244/17.23 |
| 2013/0134256 | A1* | 5/2013 | Gaillard | B64C 27/82 |
| | | | | 244/17.21 |
| 2015/0245516 | A1* | 8/2015 | Christensen | B64C 27/32 |
| | | | | 361/752 |
| 2017/0043870 | A1* | 2/2017 | Wu | B64C 39/024 |
| 2017/0247107 | A1* | 8/2017 | Hauer | B64D 35/06 |
| 2017/0253331 | A1* | 9/2017 | Nakashima | B64D 35/04 |
| 2018/0030887 | A1* | 2/2018 | Zhao | F16H 7/02 |

(Continued)

*Primary Examiner* — Richard Green
*Assistant Examiner* — Arfan Y. Sinaki
(74) *Attorney, Agent, or Firm* — Duft & Bornsen, PC

(57) ABSTRACT

Embodiments herein describe UAVs that utilize tail boom assemblies from pre-existing aircraft designs as lift generating elements. In one embodiment, a UAV includes a fuselage having a first end and a second end opposite the first end, a first tail boom coupler disposed at the first end, and a second tail boom coupler disposed at the second end. Each of the first tail boom coupler and the second tail boom coupler are configured to mechanically couple with a plurality of tail boom assemblies procured from a pre-existing aircraft design.

20 Claims, 16 Drawing Sheets

(56) References Cited

U.S. PATENT DOCUMENTS

| | | | |
|---|---|---|---|
| 2018/0170509 A1* | 6/2018 | Mores | B64C 1/06 |
| 2018/0170511 A1* | 6/2018 | Mores | B64D 9/00 |
| 2018/0244377 A1* | 8/2018 | Chan | B64C 27/08 |
| 2019/0016435 A1* | 1/2019 | Nysaeter | B64C 39/024 |
| 2019/0258139 A1* | 8/2019 | Overall | G03B 15/006 |
| 2020/0324894 A1* | 10/2020 | Fredericks | B64D 27/02 |

* cited by examiner

EXPEDITED DESIGN AND QUALIFICATION OF UNMANNED AERIAL VEHICLES

FIELD

This disclosure relates to the field of Unmanned Aerial Vehicles (UAVs), and in particular, to improving the efficiency of designing and qualifying UAVs.

BACKGROUND

The non-recurring design and qualification costs for a new UAV can be significant, as well as the risks associated with a new UAV design. UAV's that are approved to carry people, termed man-rated, require so much more effort to design, develop, and certify that the cost can be prohibitive relative to other uses. Thus, there is a need to reduce the costs as well as mitigate the risks associated with a new UAV design, especially for man-rated UAVs.

SUMMARY

Embodiments herein describe UAVs that utilize tail boom assemblies from pre-existing aircraft designs as lift generating elements. Utilizing tail boom assemblies from a previously qualified aircraft design can dramatically reduce the costs and risks associated with a new UAV design. Further, utilizing tail boom assemblies from a previously qualified man-rated helicopter design reduces the time used to design and certify a new UAV design.

One embodiment comprises a UAV that includes a fuselage, a first tail boom coupler, and a second tail boom coupler. The fuselage has a first end and a second end opposite the first end. The first tail boom coupler is disposed at the first end. The second tail boom coupler is disposed at the second end. Each of the first tail boom coupler and the second tail boom coupler mechanically couple with a plurality of tail boom assemblies procured from a pre-existing aircraft design.

Another embodiment comprises a method of fabricating a UAV. The method comprises fabricating a fuselage having a first end and second end opposing the first end. The method further comprises fabricating a first tail boom coupler at the first end of the fuselage, and fabricating a second tail boom coupler at the second end of the fuselage. Each of the first tail boom coupler and the second tail boom coupler mechanically couple with a plurality of tail boom assemblies procured from a pre-existing aircraft design.

Another embodiment comprises a UAV that includes a fuselage and at least one tail boom coupler that mechanically couples with three or more tail boom assemblies procured from a pre-existing aircraft design.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

A helicopter is a rotorcraft whose rotors are driven by a power plant during flight operations to allow the helicopter to take off vertically, hover, move forward, move backward, move laterally, and to land vertically. Helicopters with a shaft-driven single main rotor (the most common configuration) use a tail rotor or similar thruster to compensate for the torque generated by the main rotor during flight operations. The thrust generated by the tail rotor does not provide lift in this configuration.

In helicopters, a tail boom extends from a fuselage and includes a tail rotor on an end of the tail boom. The tail boom operates as a moment arm for the thrust generated by the tail rotor. In order for the tail rotor to prevent the helicopter from yawing uncontrollably due to the torque generated by the main rotor, the thrust generated by the tail rotor is perpendicular to the tail boom in a horizontal direction, or slightly downward. Further, an efficient way to vary the thrust generated by the tail rotor is using collective pitch control. With collective pitch control, the rotational speed of the tail rotor remains constant, while the pitch of the blades of the tail rotor changes. An increase in pitch results in an increase in thrust, while a decrease in pitch results in a decrease in thrust. A drive system for a tail rotor typically includes one or more drive shafts that transmit mechanical power from the power plant to the tail rotor. At the end of the tail boom, a gearbox provides an angled drive for the tail rotor. The gearbox converts the rotation of the drive shaft(s) from an axis that is substantially parallel to the tail boom to a rotation that is substantially perpendicular to the tail boom. Some single-rotor helicopters have multiple gearboxes and shafts between the tail boom and the tail rotor, but the orientation of the tail rotor thrust is common to all.

Figure 1:
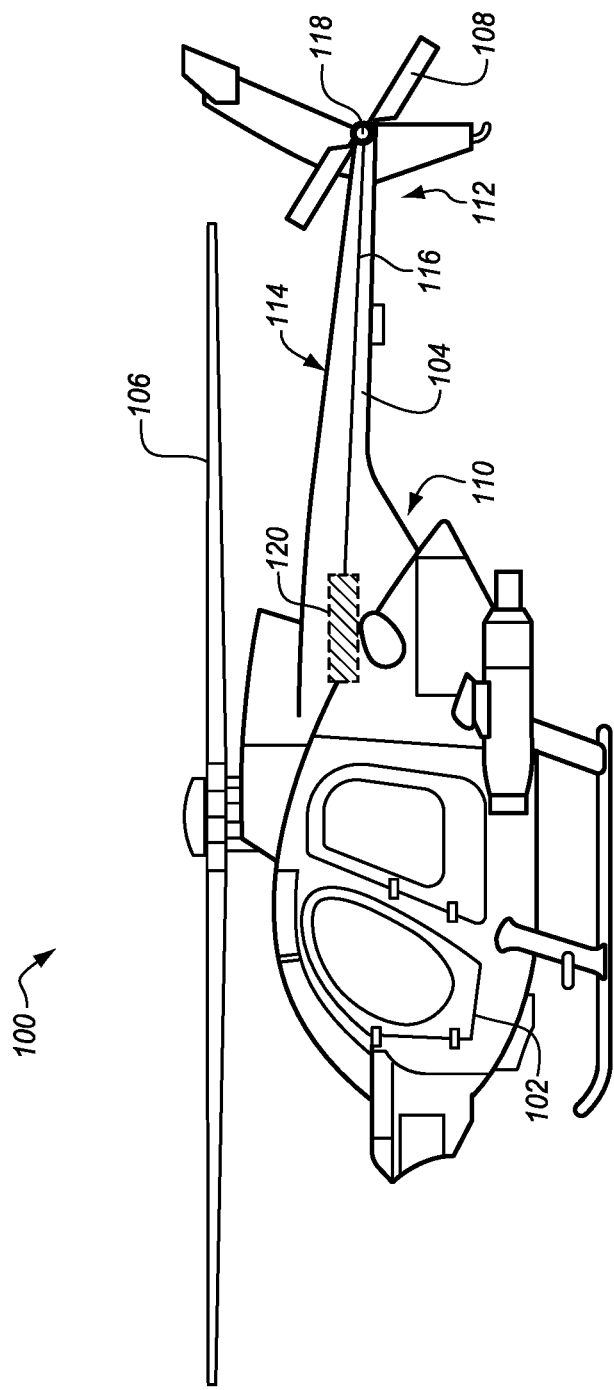
FIG. 1 is a side view of a helicopter that utilizes a single main rotor.

FIG. 1 is a side view of a helicopter 100 that utilizes a single main rotor 106. In this view, helicopter 100 includes a fuselage 102, a tail boom assembly 104 that has a first end 110 coupled to fuselage 102, main rotor 106, and a tail rotor 108 proximate to a second end 112 of tail boom assembly 104. Tail boom assembly 104 includes a tail rotor drive system 114, which includes a drive shaft 116 and an angled gearbox 118. Drive shaft 116 is mechanically coupled to a power plant 120 via a transmission (not shown). As drive shaft 116 rotates, angled gearbox 118 coupled to drive shaft 116 provides an angled drive to tail rotor 108. Main rotor 106 in FIG. 1 provides lift to helicopter 100. In order to compensate for a yaw induced upon helicopter 100 from main rotor 106, tail rotor 108 provides a thrust that is substantially perpendicular to tail boom assembly 104.

Figure 2:
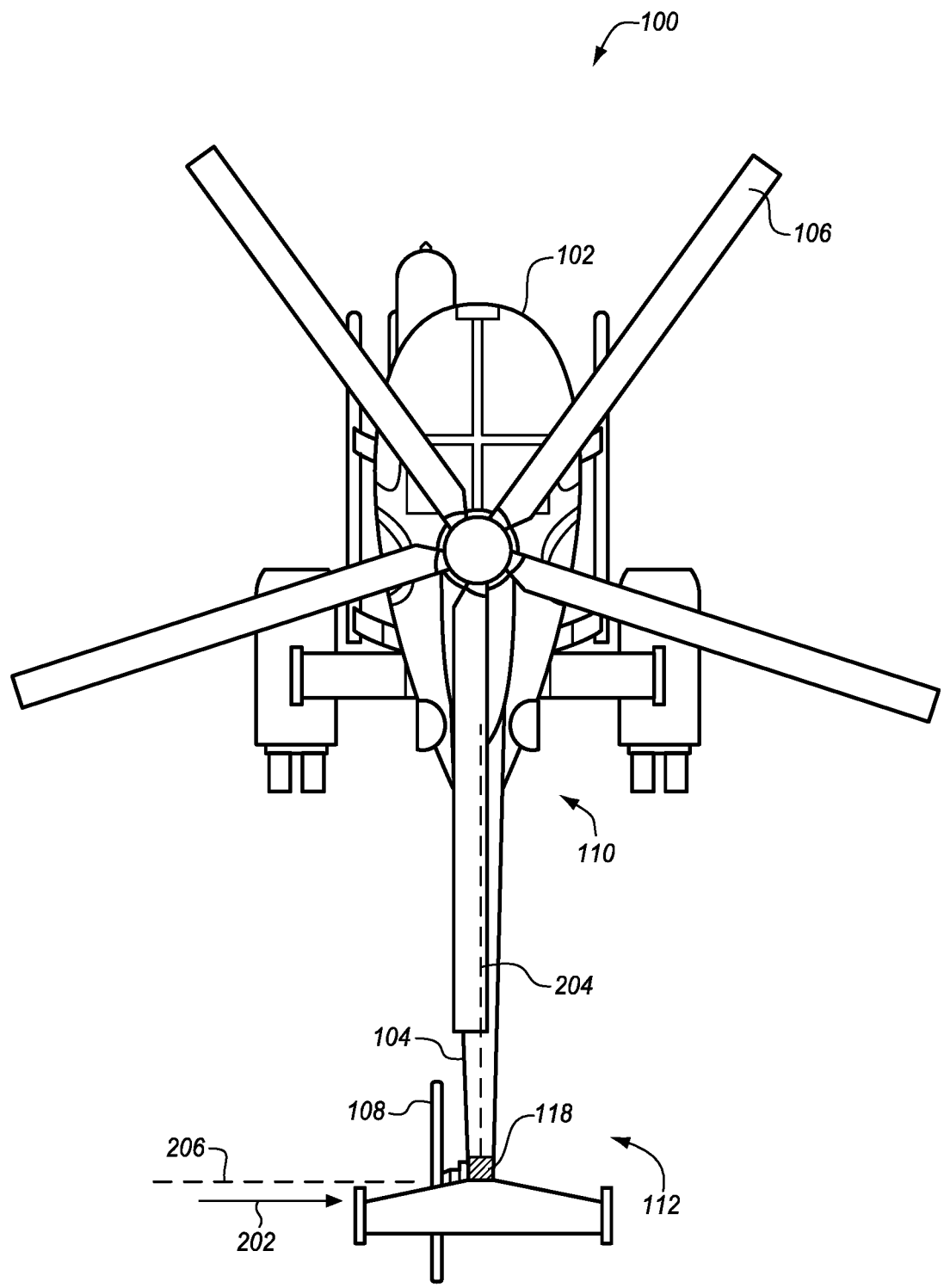
FIG. 2 is a top view of the helicopter of FIG. 1.

FIG. 2 is a top view of helicopter 100. In this view, tail rotor 108 is oriented at a position 202 that is substantially parallel to tail boom assembly 104. More specifically, position 202 is substantially parallel to an axis 204 through tail boom assembly 104 that traverses from first end 110 to second end 112. This orientation enables tail rotor 108 to provide thrust 206 that is substantially perpendicular to axis 204 of tail boom assembly 104. The orientation of tail rotor 108 illustrated in FIG. 2 is common to modern helicopters that include a single main rotor 106. For example, position 202 of tail rotor 108 illustrated in FIG. 2 enables helicopter 100 to perform a hover operation during flight operations.

Designing and qualifying helicopter 100 prior to placing helicopter 100 in service may entail significant costs, time, and effort. Once completed, the re-use of some of the parts of helicopter 100 can mitigate risk and reduce costs associated with subsequent aircraft programs, such as UAV programs. For instance, the re-use of tail boom assembly 104 and/or power plant 120 from helicopter 100 as a design element in a UAV program can significantly reduce the costs and risks for a new UAV design.

In the embodiments described herein, UAVs and their method of manufacture utilize various elements of helicopter 100 (e.g., tail boom assembly 104, power plant 120, etc.) in order to reduce the effort, time, and risks associated with the design and qualification of a new UAV.

Figure 3:
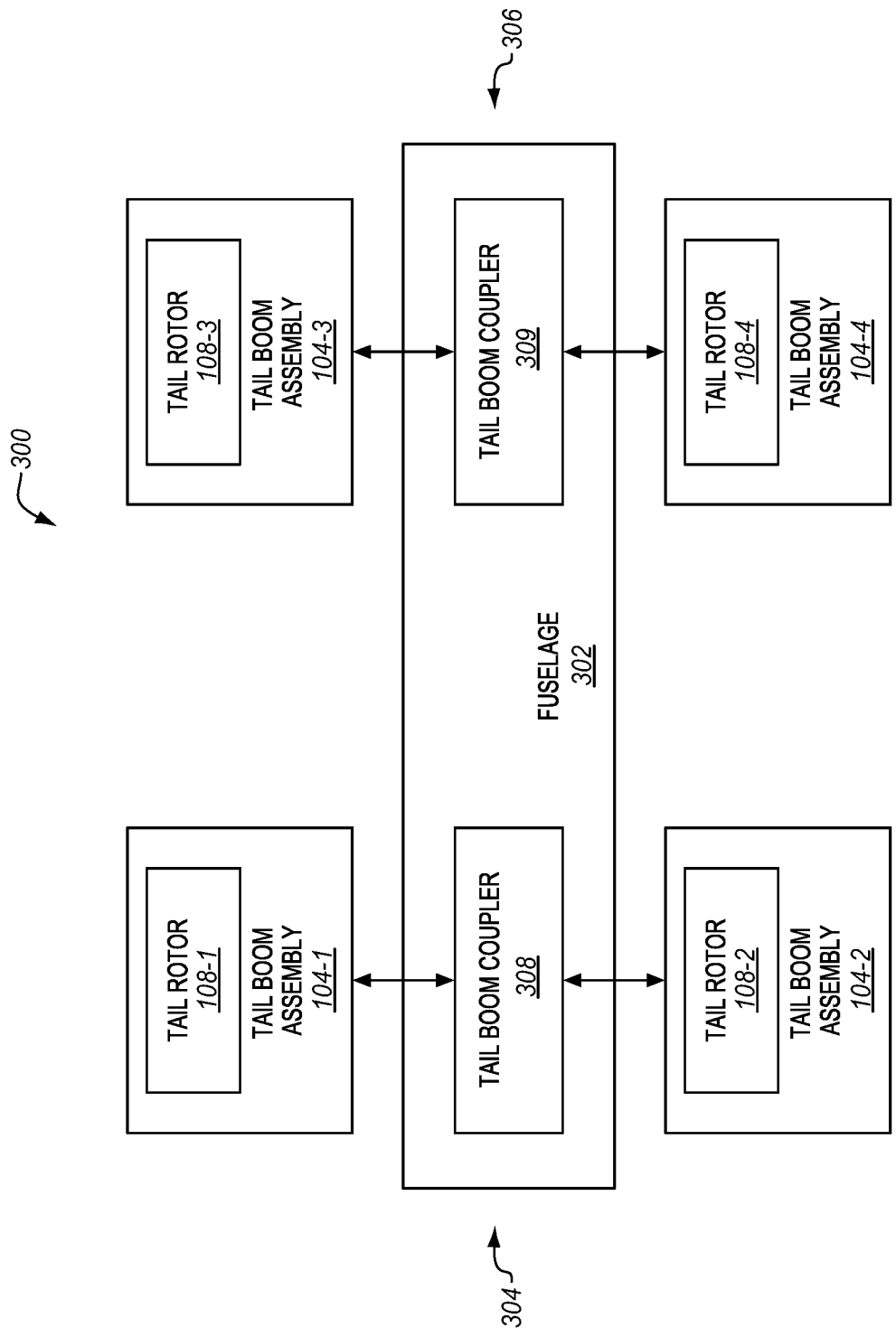
FIGS. 3-5 are block diagrams of a UAV in various illustrative embodiments.

FIG. 3 is a block diagram of a UAV 300 in an illustrative embodiment. In this embodiment, UAV 300 includes a fuselage 302 having an end 304 (i.e., a first end) and an end 306 (i.e., a second end) that opposes end 304. In this embodiment, a tail boom coupler 308 (i.e., a first tail boom coupler) is disposed at end 304 and a tail boom coupler 309 (i.e., a second tail boom coupler) is disposed at end 306. In this embodiment, tail boom couplers 308-309 are configured to mechanically couple a plurality of tail boom assemblies 104 to fuselage 302. For example, tail boom couplers 308-309 are fabricated to have specifically designed mating surfaces (not shown) that mate to first end 110 of tail boom assembly 104. Although four tail boom assemblies 104 are illustrated in FIG. 3, tail boom couplers 308-309 may couple any number of tail boom assemblies 104 to fuselage 302. In FIG. 3, tail boom coupler 308 mechanically couples tail boom assembly 104-1 and tail boom assembly 104-2 to fuselage 302, and tail boom coupler 309 mechanically couples tail boom assembly 104-3 and tail boom assembly 104-4 to fuselage 302.

In this embodiment, tail rotor 108-1 and tail rotor 108-4 rotate in the same direction which is opposite of tail rotor 108-2 and tail rotor 108-3 such that the forces and moments are balanced with tail rotors 108 are operating at the same condition (e.g., speed and collective). For a pre-qualified tail rotor 108-1, tail rotor 108-2 rotating in the opposite direction may be existing and pre-certified already, and/or may be identical and opposite to tail rotor 108-1, thereby leveraging the pre-qualification and/or pre-certification of tail rotor 108-1 by similarity. In other embodiments, tail rotors 108 may turn in the same direction, with control generated by tilting tail rotors 108 away from a horizontal configuration or other means.

Figure 4:
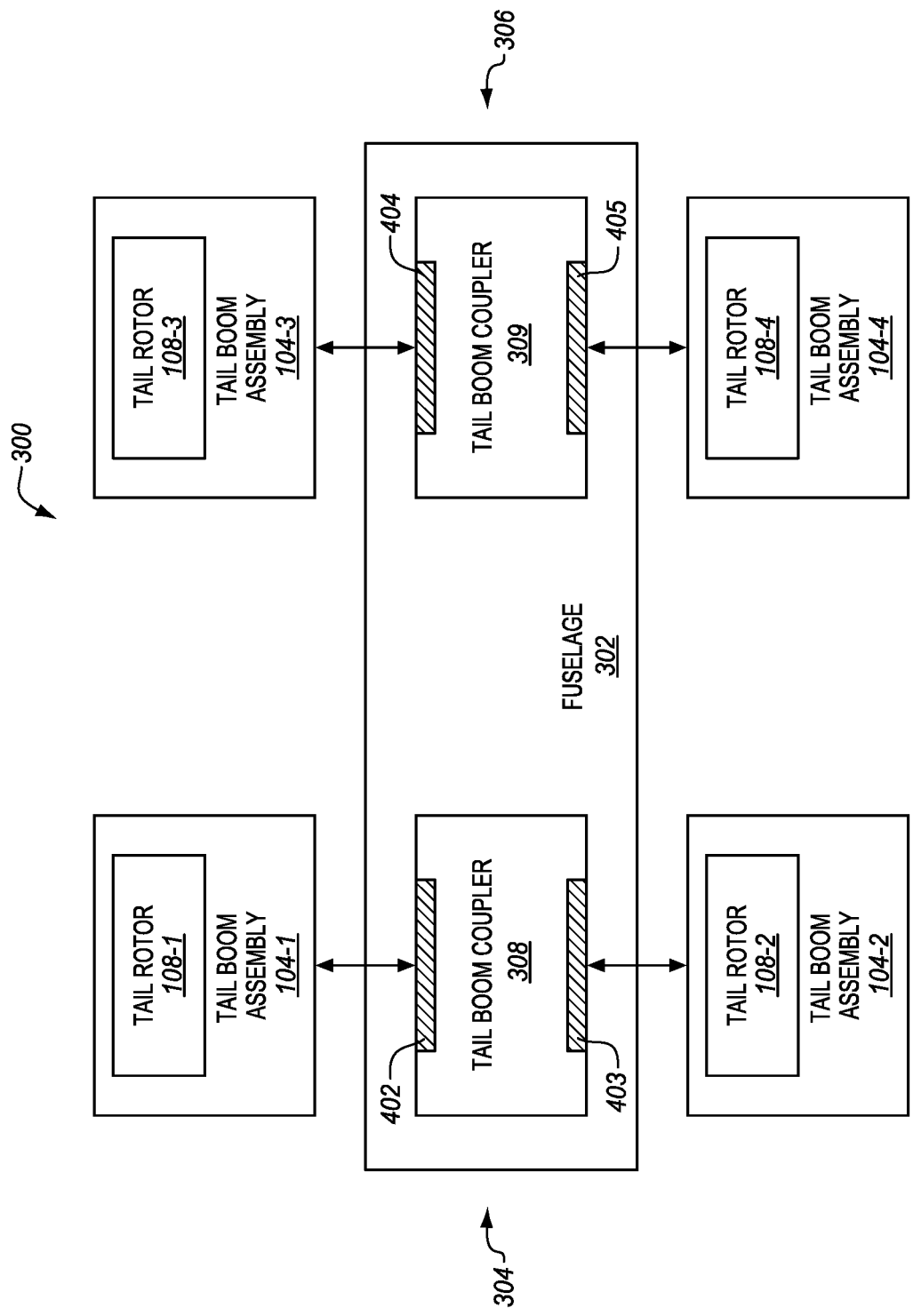

FIG. 4 is a block diagram of UAV 300 in another illustrative embodiment. In this embodiment, tail boom coupler 308 includes attachment faces 402-403 that are configured to mechanically couple tail boom assembly 104-1 and tail boom assembly 104-2 to fuselage 302. In particular, attachment face 402 (i.e., a first attachment face) mechanically couples tail boom assembly 104-1 to fuselage 302 and attachment face 403 (i.e., a second attachment face) mechanically couples tail boom assembly 104-2 to fuselage 302. Attachment faces 402-403 comprise any component(s), system(s), or device(s) that enable tail boom assembly 104 to be mechanically coupled to fuselage 302. More specifically, attachment faces 402-403 may be specifically designed to mate to first end 110 of tail boom assembly 104.

Further in this embodiment, tail boom coupler 309 includes attachment faces 404-405 that are configured to mechanically couple tail boom assembly 104-3 and tail boom assembly 104-4 to fuselage 302. In particular, attachment face 404 (i.e., a first attachment face) mechanically couples tail boom assembly 104-3 to fuselage 302 and attachment face 405 (i.e., a second attachment face) mechanically couples tail boom assembly 104-4 to fuselage 302. Attachment faces 404-405 comprise any component(s), system(s), or device(s) that enable tail boom assembly 104 to be mechanically coupled to fuselage 302. More specifically, attachment faces 404-405 may be specifically designed to mate to first end 110 of tail boom assembly 104. In some embodiments, attachment faces 402-403 oppose each other and/or attachment faces 404-405 oppose each other. When attachment faces 402-403 oppose each other and attachment faces 404-405 oppose each other, UAV 300 may form a configuration of an "H", with tail boom assembly 104 extending perpendicularly from fuselage 302.

Figure 5:
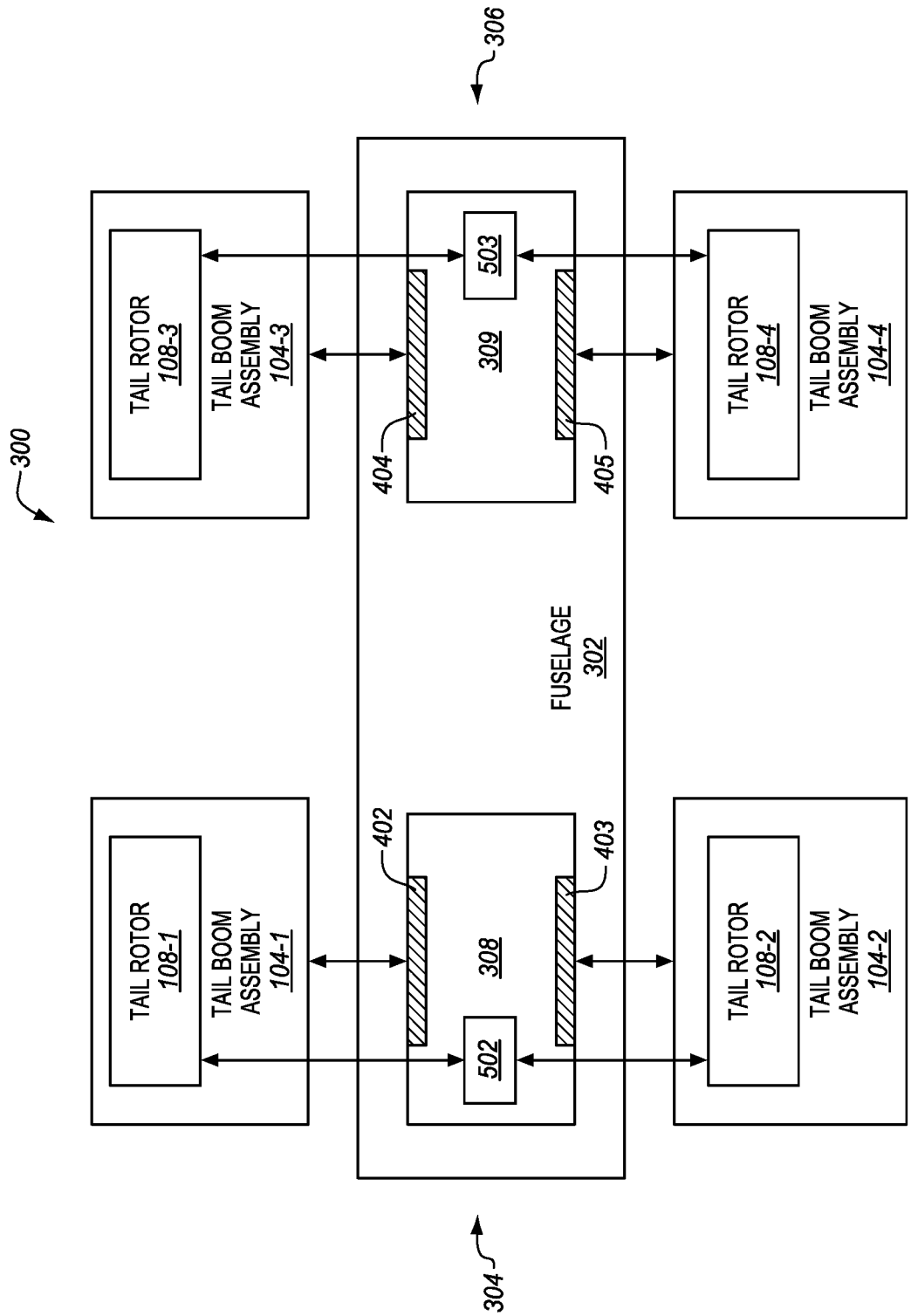

FIG. 5 is a block diagram of UAV 300 in another illustrative embodiment. In this embodiment, tail boom couplers 308-309 include collective pitch systems 502-503, respectively. Collective pitch system 502 comprises any component(s), system(s), or device(s) that varies a pitch of tail rotor 108-1 and/or tail rotor 108-2. Collective pitch system 502 may vary the pitch of tail rotor 108-1 and 108-2 collectively or individually. Varying the pitch of tail rotor 108-1 and/or tail rotor 108-2 varies the thrust generated by tail rotor 108-1 and/or tail rotor 108-2. Collective pitch system 503 comprises any component(s), system(s), or device(s) that varies a pitch of tail rotor 108-3 and/or tail rotor 108-4. Collective pitch system 503 may vary the pitch of tail rotor 108-3 and 108-4 collectively or individually. Varying the pitch of tail rotor 108-3 and/or tail rotor 108-4 varies the thrust generated by tail rotor 108-3 and/or tail rotor 108-4.

Figure 6:
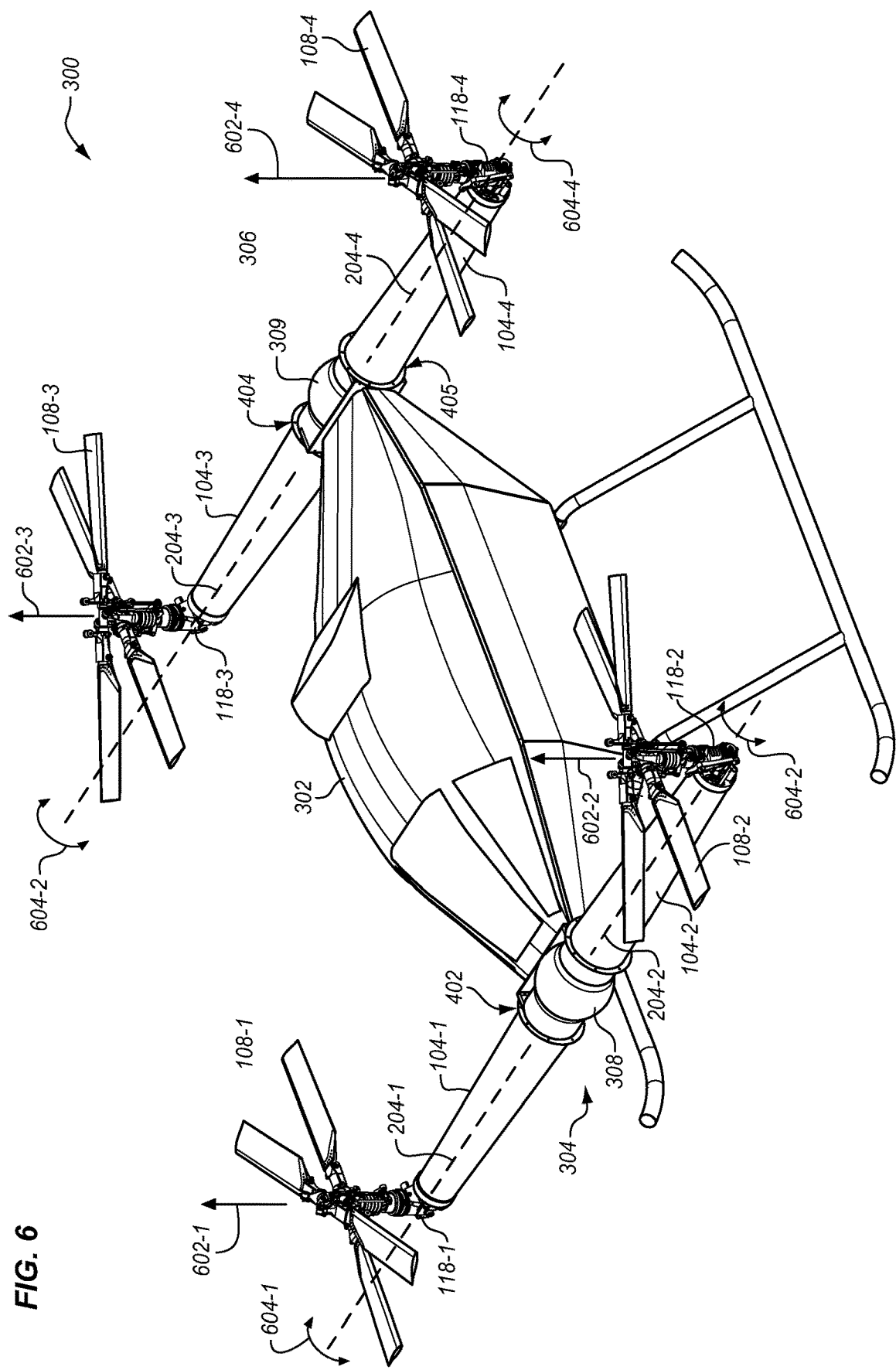
FIG. 6 is a perspective view of the UAV of FIGS. 3-5 in an illustrative embodiment.
Figure 7:
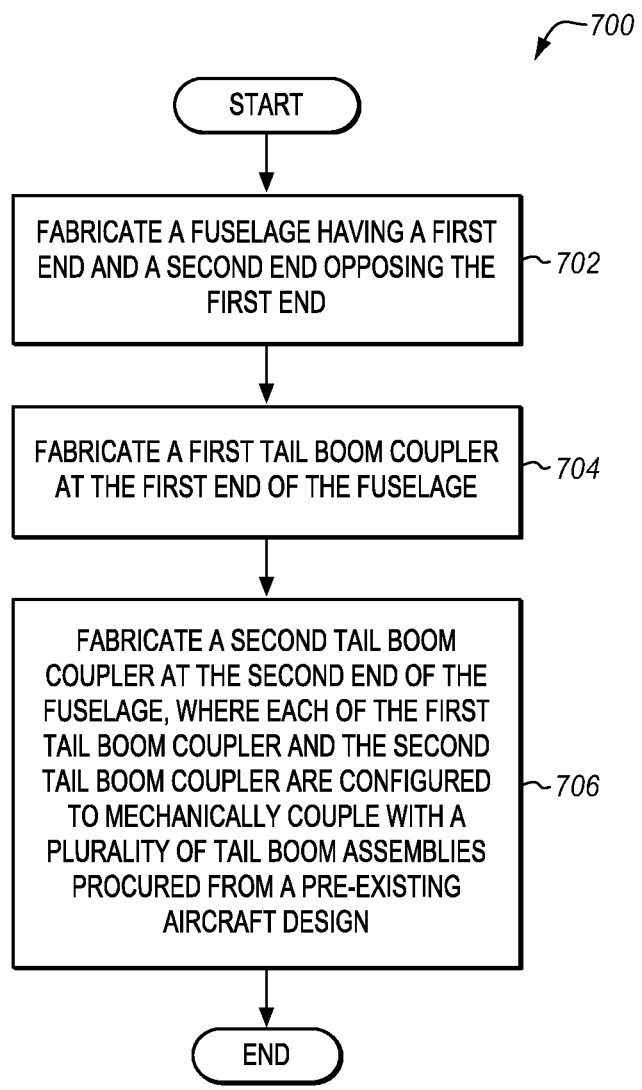
FIGS. 7-11 are flow charts of a method of fabricating a UAV in various illustrative embodiments.

FIG. 6 is a perspective view of UAV 300 in an illustrative embodiment. Although UAV 300 is depicted to have a particular configuration, UAV 300 may have other configurations in other embodiments. As discussed previously, collective pitch control may be used by UAV 300 to vary the thrust generated by tail rotors 108. In particular, collective pitch control of tail rotors 108 may allow UAV 300 to achieve a high level of performance, as varying the pitch of tail rotors 108 dynamically varies a thrust 602 generated by tail rotors 108 faster than varying the speed of tail rotors 108. For instance, increasing (or decreasing) the collective pitch of tail rotor 108-1 and 108-3 with respect to tail rotor 108-2 and tail rotor 108-4 varies thrust 602-1 and thrust 602-3, and allows UAV 300 to quickly perform a roll maneuver. Increasing (or decreasing) the collective pitch of tail rotor 108-1 and tail rotor 108-2 with respect to tail rotor 108-3 and tail rotor 108-4 varies thrust 602-2 and thrust 602-4, and allows UAV 300 to quickly perform a pitch maneuver. Further, increasing the collective pitch of tail rotor 108-1 and tail rotor 108-4 together while reducing the collective pitch of tail rotor 108-2 and tail rotor 108-3 allows UAV 300 to perform a yaw maneuver while maintaining a constant lift. Further still, various combinations of pitch, roll, and yaw maneuvers may be performed by individually varying thrust 602-1, 602-2, 602-3, and/or 602-4.

In some embodiments, tail boom coupler 308 and/or tail boom coupler 309 may be configured to rotate attachment faces 402-403, and/or 404-405, respectively, to change an orientation of tail rotors 108 of tail boom assemblies 104. In particular, attachment faces 402-405 may be rotated collectively, individually, and/or based on a desired performance of UAV 300. For instance, tail boom coupler 308 may rotate attachment face 402 and tail boom assembly 104-1 coupled to attachment face 402 toward end 304 and/or toward end 306 as indicated by arrows 604-1. This varies the direction of thrust 602-1. In addition to or instead of, tail boom coupler 308 may rotate attachment face 403 and tail boom assembly 104-2 coupled to attachment face 403 toward end 304 and/or toward end 306 as indicated by arrows 604-2. This varies the direction of thrust 602-2. In continuing with the example, tail boom coupler 309 may rotate attachment face 404 and tail boom assembly 104-3 coupled to attachment face 404 toward end 304 and/or toward end 306 as indicated by arrows 604-3. This varies the direction of thrust 602-3. In addition to or instead of, tail boom coupler 309 may rotate attachment face 405 and tail boom assembly 104-4 coupled to attachment face 405 toward end 304 and/or toward end 306 as indicated by arrows 604-4. This varies the direction of thrust 602-4. Varying the direction of thrust 602 enables UAV 300 to perform complicated dynamic maneuvers, including vertical lift and movement in any direction. Further, the inclusion of collective pitch control for tail rotors 108 along with dynamically varying directions for thrust 602 generated by tail rotors 108 allows UAV 300 to achieve a high level of maneuverability and speed. While not shown, one or more wings may be used to provide lift and control during forward flight.

In some embodiments, tail boom assembly 104-1 is coaxial with tail boom assembly 104-2, and tail boom assembly 104-3 is coaxial with tail boom assembly 104-4. More specifically, tail boom assembly 104-1 and tail boom assembly 104-2 share a first axis (collectively axis 204-1 and axis 204-2) and tail boom assembly 104-3 and tail boom assembly 104-4 share a second axis (collectively axis 204-3 and axis 204-4). In some embodiments, the first and second axis may be substantially parallel with each other (i.e., axis 204-1 is substantially parallel to axis 204-3, and axis 204-2 is substantially parallel to axis 204-4).

Figure 16:
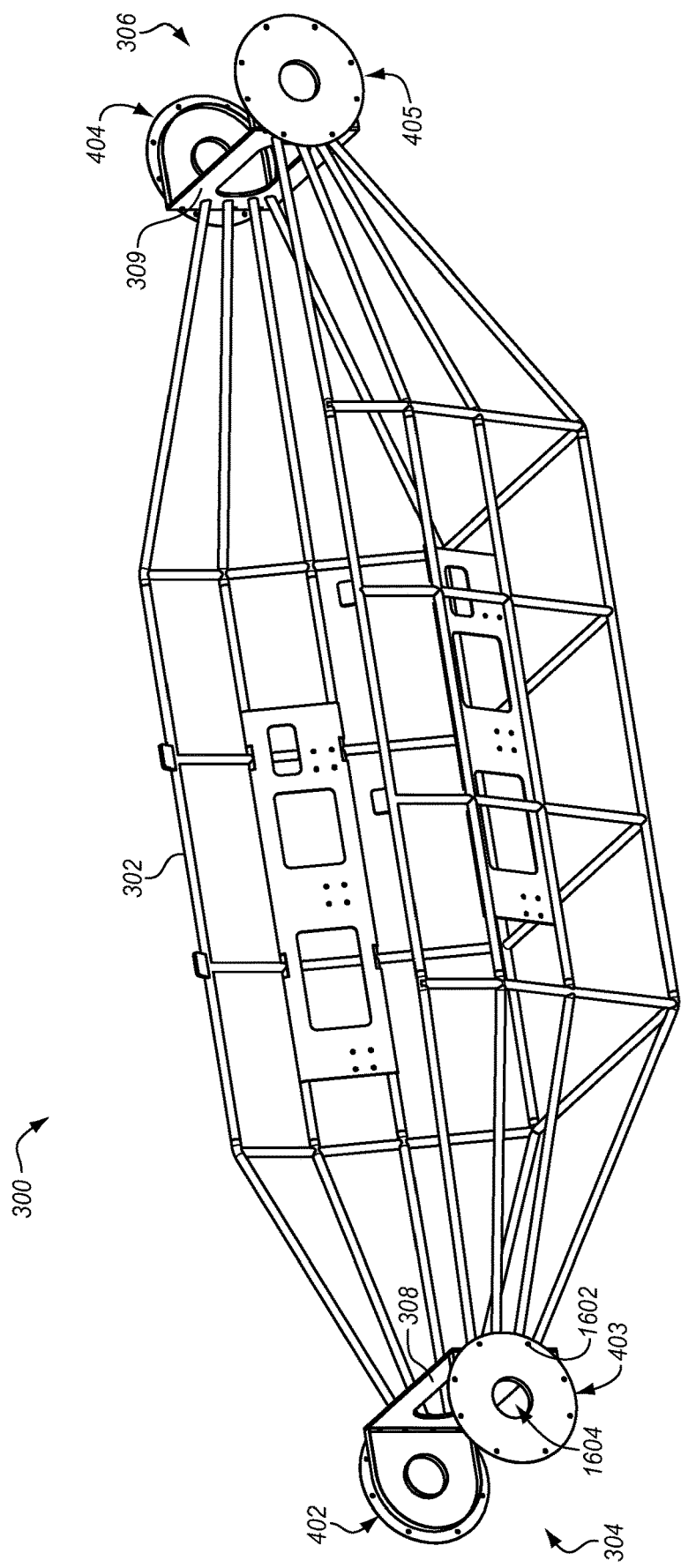
FIG. 16 is another perspective view of the UAV of FIGS. 3-5 in an illustrative embodiment.

FIG. 16 is another perspective view of UAV 300 in an illustrative embodiment. In this view, a number of elements previously shown in FIG. 6 have been removed to illustrate additional interior details of UAV 300. In this embodiment, fuselage 302 is shown, along with tail boom couplers 308-309. Attachment faces 402-405 are illustrated in this embodiment as flat surfaces that are circular in shape. Each of attachment faces 402-405 further include a plurality of mounting holes 1602 in this embodiment, which may be used to secure tail boom assemblies 104 to tail boom couplers 308-308. Tail boom couplers 308-309 are also illustrated in this view as including an interior cutout 1604, which is circular in shape in this embodiment. Interior cutout 1604 may be used to enable a drive shaft of tail rotor drive system 114 to pass through attachment faces 402-405 and mechanically couple with a transmission (not shown in this view) that is disposed within or proximate to tail boom couplers 308-309.

FIGS. 7-11 are flow charts of a method 700 of fabricating a UAV in an illustrative embodiment. Method 700 will be discussed with respect to UAV 300, although method 700 may apply to other UAVs, not shown. The steps illustrated for method 700 are not all inclusive, and method 700 may include other steps not shown or described. Further, the steps of method 700 may be performed in an alternate order.

In one embodiment, fabricating UAV 300 comprises fabricating fuselage 302 (see step 702). Fuselage 302 may be fabricated using any number of materials and/or steps. Fabricating UAV 300 further comprises fabricating tail boom coupler 308 at end 304 of fuselage 302 (see step 704). Fabricating tail boom coupler 308 may entail determining which type of helicopter 100 will be used to supply tail boom assembly 104, which may dictate how tail boom coupler 308 is configured to attach to tail boom assembly 104.

Fabricating UAV 300 further comprises fabricating tail boom coupler 309 at end 306 of fuselage 302 (see step 706). Fabricating tail boom coupler 309 may include a similar process as described for tail boom coupler 308. For instance, the design of tail boom couplers 308-309 may be similar or substantially identical.

Figure 8:
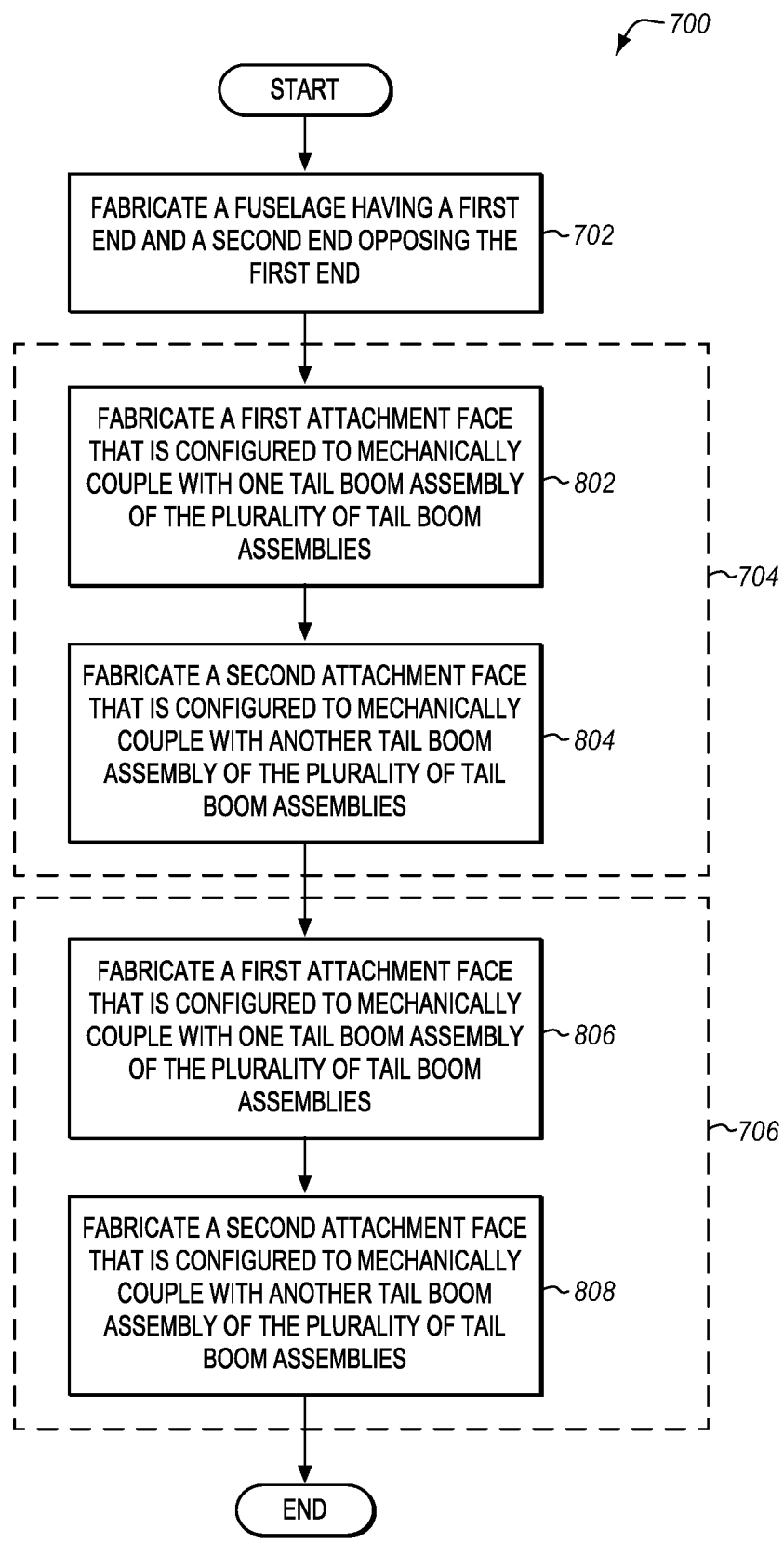

In other embodiments, fabricating tail boom coupler 308 may include the additional details depicted in FIG. 8, which entails fabricating attachment faces 402-403 for tail boom coupler 308 (see steps 802, 804). Fabricating attachment faces 402-403 generally depend on how first end 110 of tail boom assembly 104 mounts to helicopter 100. Fabricating tail boom coupler 309 may also include the additional details depicted in FIG. 8, which entails fabricating attachment faces 404-405 for tail boom coupler 309 (see steps 806, 808). Fabricating attachment faces 404-405 generally depend on how first end 110 of tail boom assembly 104 mounts to helicopter 100.

Figure 9:
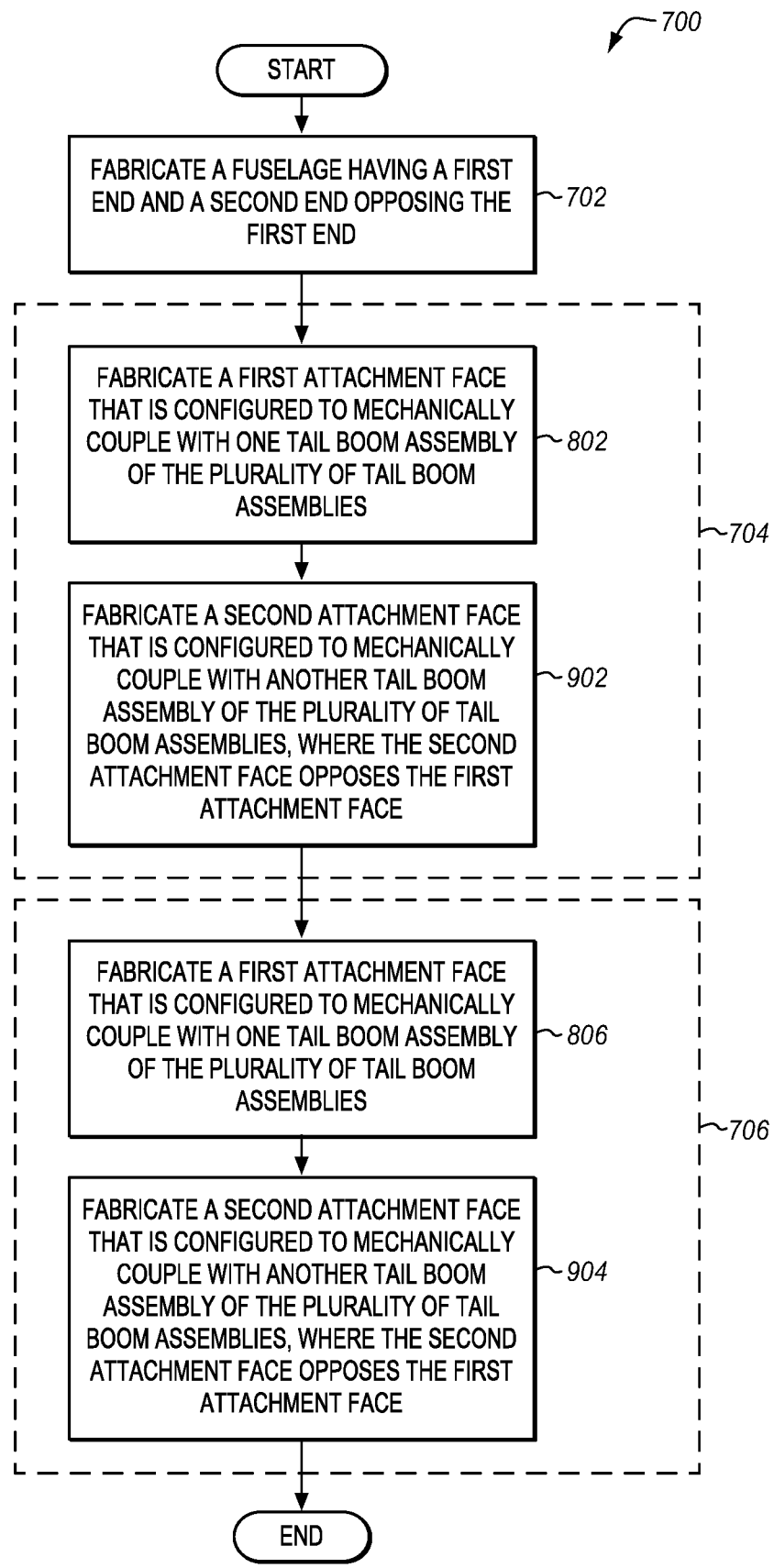

In other embodiments, fabricating tail boom couplers 308-309 may include the additional details depicted in FIG. 9, which entails fabricating attachment face 403 in opposition to attachment face 402 (see step 902) and fabricating attachment face 405 in opposition to attachment face 404 (see step 904).

Figure 10:
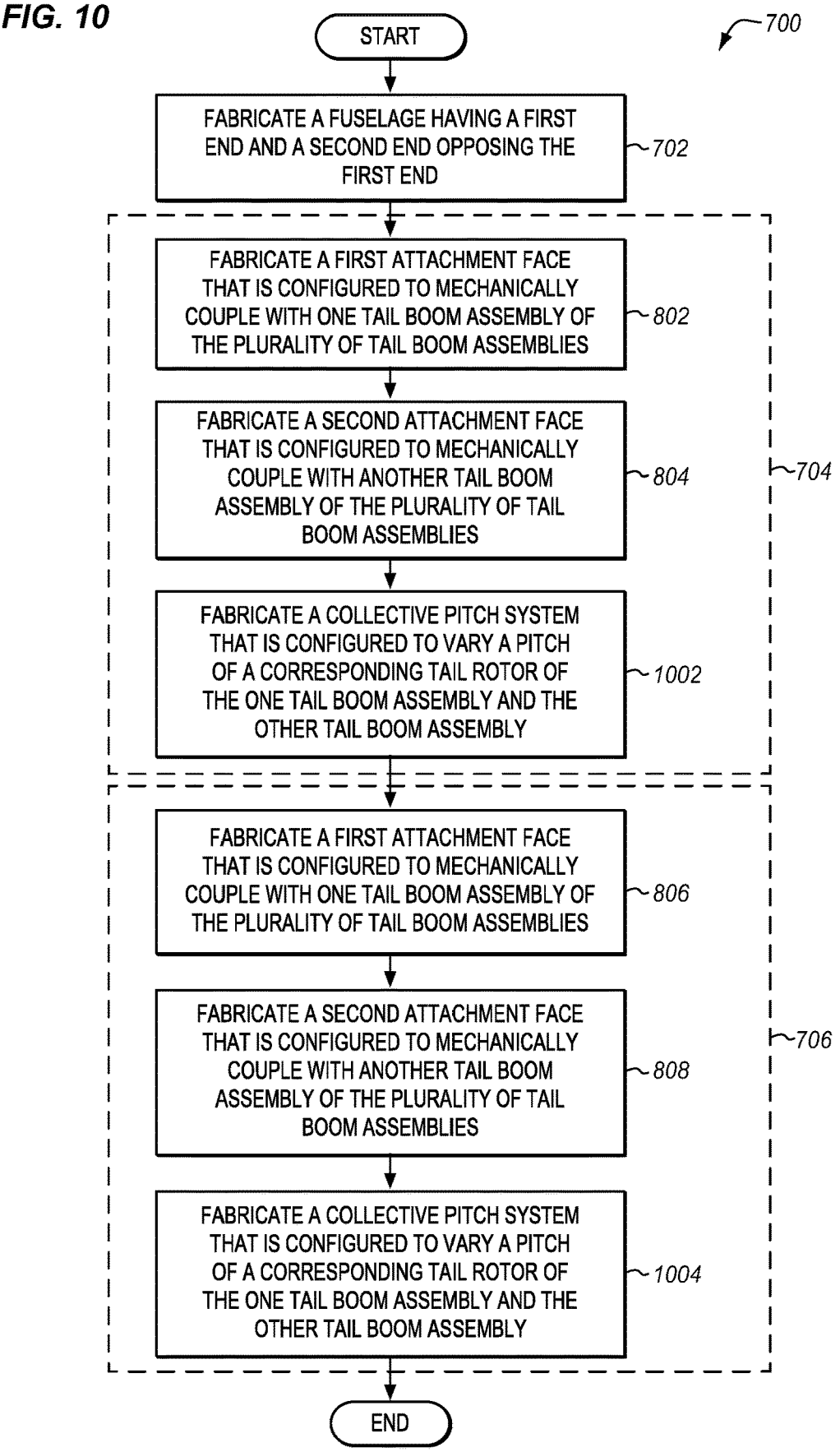

In other embodiments, fabricating tail boom couplers 308-309 may include the additional details depicted in FIG. 10, which entails fabricating collective pitch system 502 for tail boom coupler 308 (see step 1002) and fabricating collective pitch system 503 for tail boom coupler 309 (see step 1004).

Figure 11:
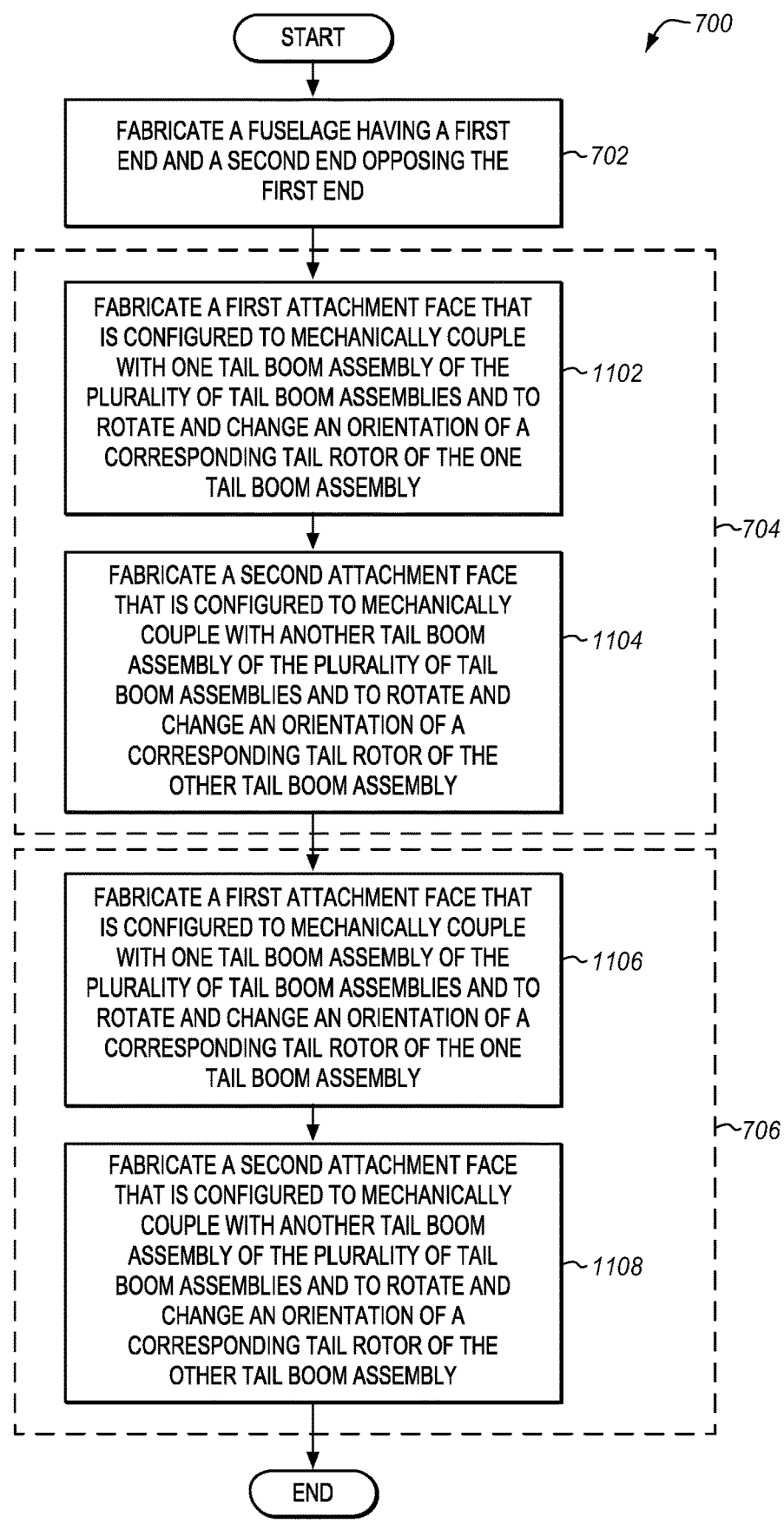

In other embodiments, fabricating tail boom couplers 308-309 may include the additional details depicted in FIG. 11, which entails configuring attachment faces 402-403 to rotate in order to change an orientation of tail rotor 108-1 and tail rotor 108-2 (see step 1102 and step 1104) and configuring attachment faces 404-405 to rotate in order to change an orientation of tail rotor 108-3 and tail rotor 108-4 (see step 1106 and step 1108).

Figure 12:
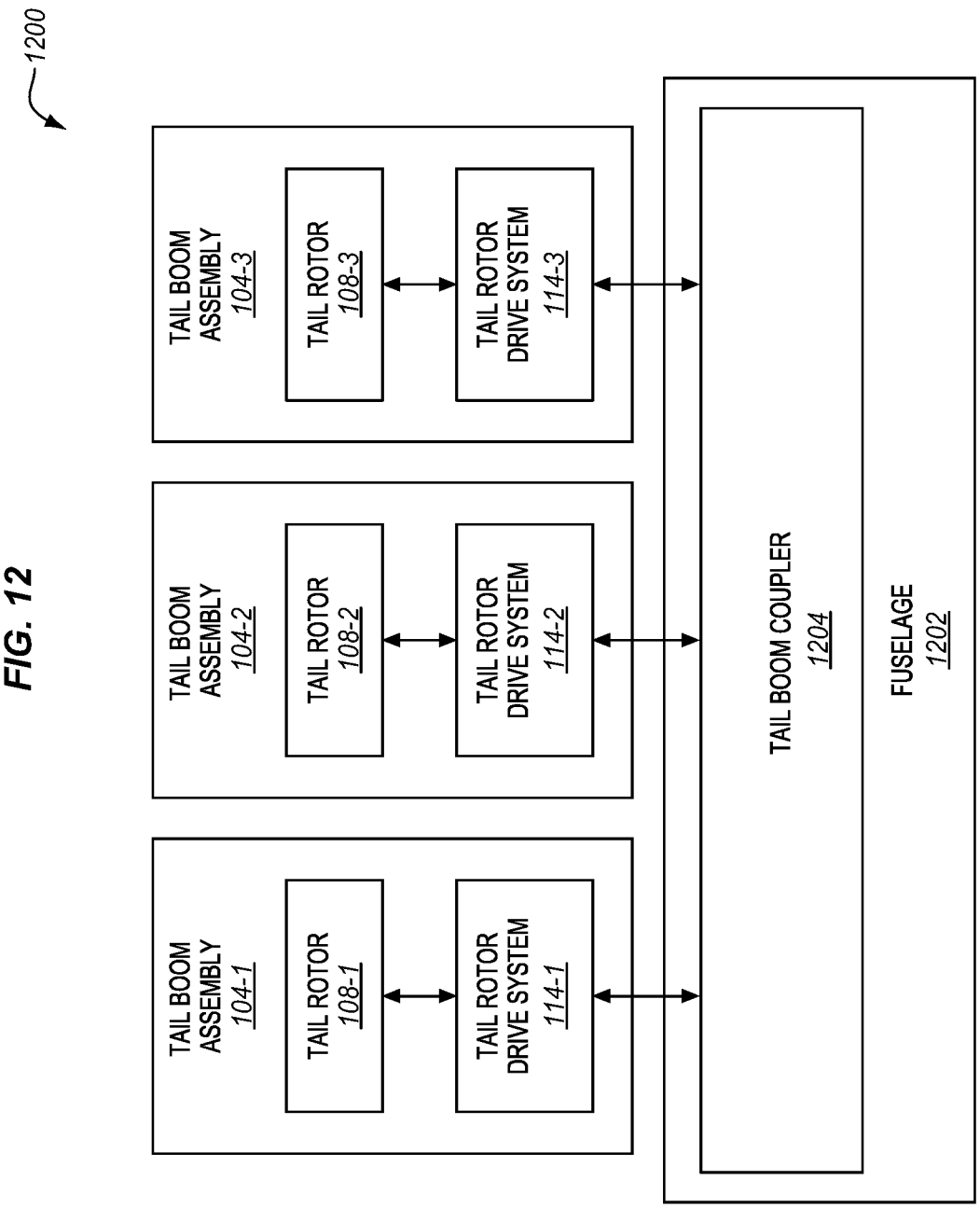
FIGS. 12-15 are block diagrams of a UAV in various illustrative embodiments.

FIGS. 12-15 are block diagrams of a UAV 1200 in various illustrative embodiments. In this embodiment, UAV 1200 includes a fuselage 1202 and at least one tail boom coupler 1204 that is configured to mechanically couple with three or more tail boom assemblies 104 procured from a pre-existing aircraft design. In particular, tail boom coupler 1204 is configured to mechanically couple with tail boom assembly 104-1, tail boom assembly 104-2, and tail boom assembly 104-3. Although only three tail boom assemblies 104 are illustrated in FIG. 12, tail boom coupler 1204 may mechanically couple with more tail boom assemblies 104 as a matter of design choice (e.g., tail boom coupler 1204 may mechanically couple with four, six, or more tail boom assemblies 104).

In some embodiments, tail boom assembly 104 includes tail rotor drive system 114, which is mechanically coupled with tail rotor 108. Both tail rotor drive system 114 and tail rotor 108 have been previously described.

Figure 13:
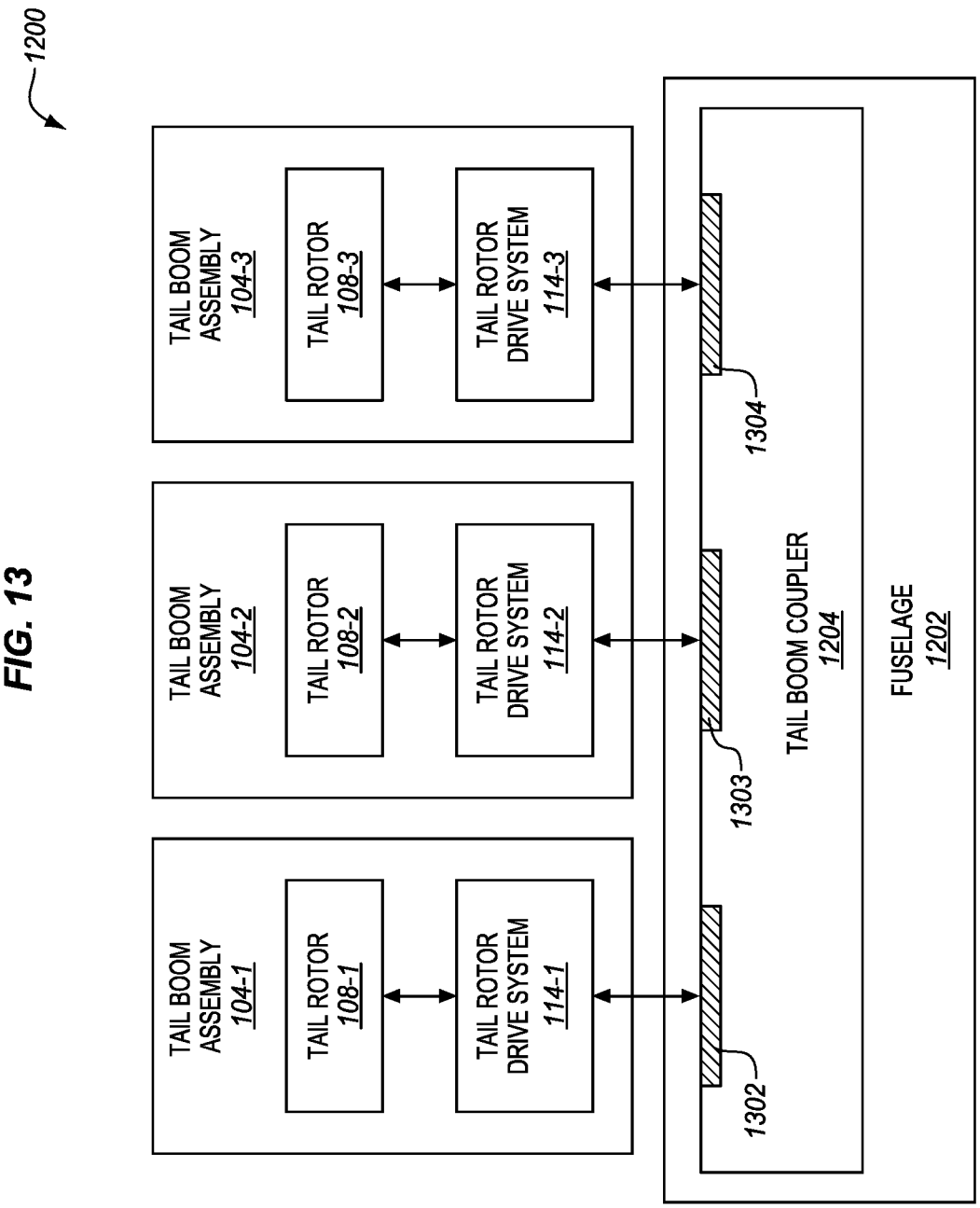

In some embodiments, tail boom coupler 1204 includes at least three attachment faces 1302-1304 which are configured to mechanically couple with three or more tail boom assemblies 104 as illustrated in FIG. 13. Attachment faces 1302-1304 may be similar to attachment faces 402-405, previously described with respect to UAV 300. In particular, attachment face 1302 mechanically couples with tail boom assembly 104-1, attachment face 1303 mechanically couples with tail boom assembly 104-2, and attachment face 1304 mechanically couples with tail boom assembly 104-3. Attachment faces 1302-1304 may be configured, for example, to rotate collectively or individually to change an orientation of tail rotors 108. For instance, attachment face 1302 may rotate to change an orientation of tail rotor 108-1, attachment face 1303 may rotate to change an orientation of tail rotor 108-2, and/or attachment face 1304 may rotate to change an orientation of tail rotor 108-3.

Figure 14:
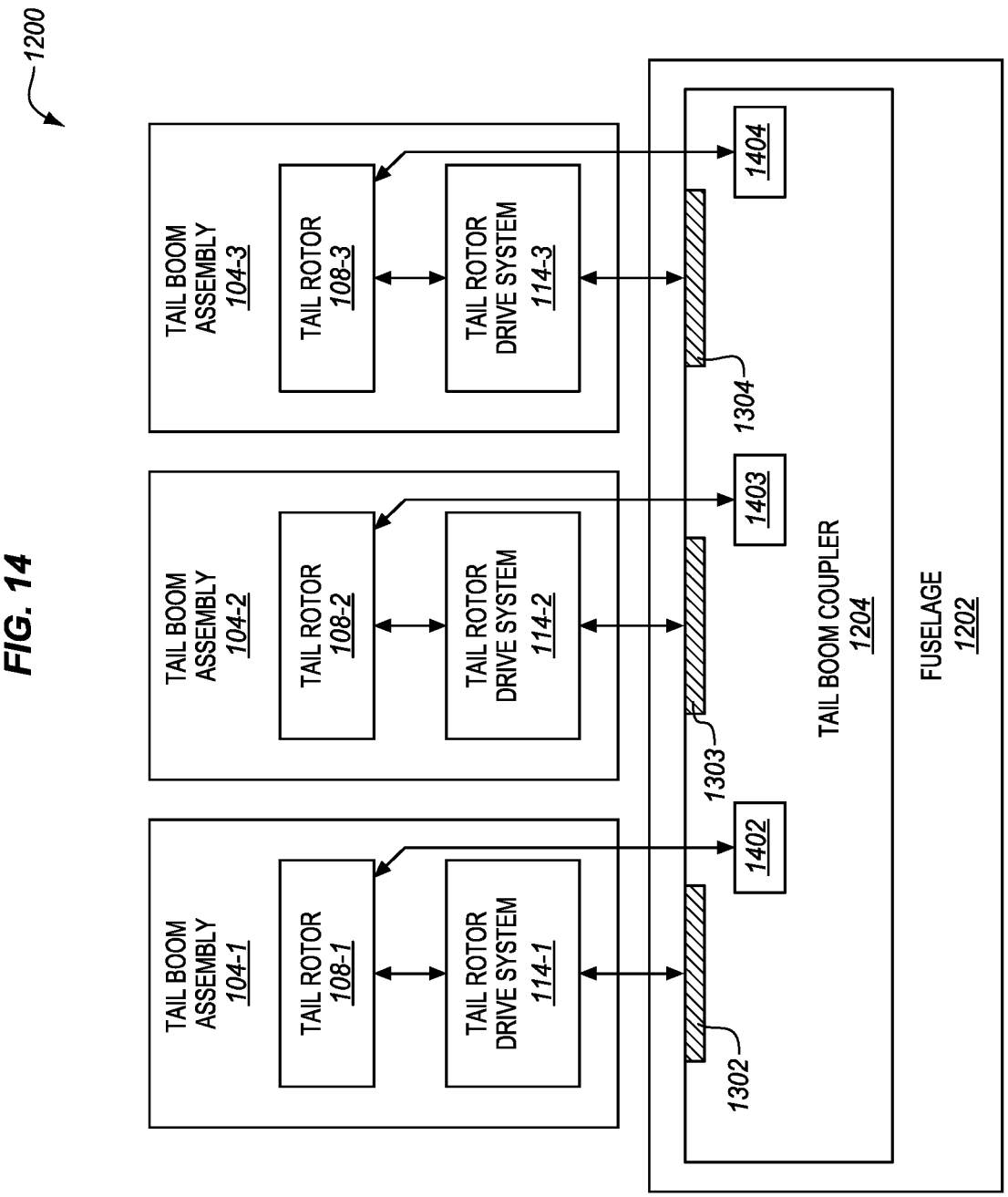

In some embodiments, UAV 1200 may include one or more collective pitch systems 1402-1404 that are configured to vary a pitch of one or more of tail rotors 108 as illustrated in FIG. 14. Collective pitch systems 1402-1404 may be similar to collective pitch system 502 and/or collective pitch system 503 of UAV 300, previously described.

Figure 15:
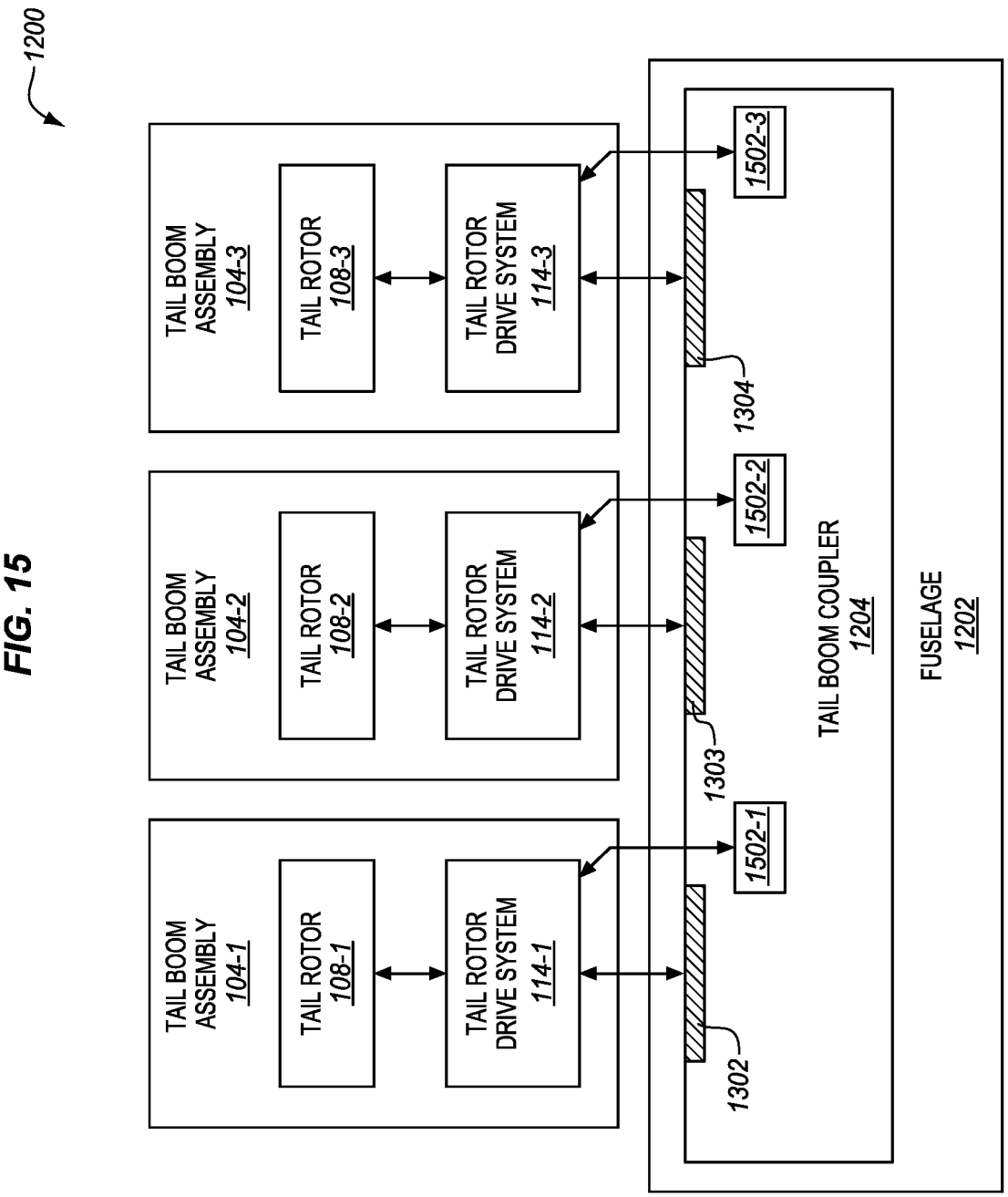

In some embodiments, UAV 1200 includes at least one mechanical power source 1502 that is configured to mechanically couple with tail rotor drive system 114 of tail boom assemblies 104 as illustrated in FIG. 15. In some embodiments, mechanical power source 1502 comprises power plant 120 of helicopter 100 (see FIG. 1). In other embodiments, mechanical power source 1502 comprises an electric motor. Mechanical power source 1502 may comprise a single electric motor that utilizes various drive shafts and transmissions for power delivery (not shown) or multiple electric motors, each coupled with one of tail boom assemblies 104. For example, mechanical power source 1502-1 may mechanically couple with tail rotor drive system 114-1 of tail boom assembly 104-1, mechanical power source 1502-2 may mechanically couple with tail rotor drive system 114-2 of tail boom assembly 104-2, and mechanical power source 1502-3 may mechanically couple with tail rotor drive system 114-3 of tail boom assembly 104-3. The electric motors may be powered by an energy storage device (not shown) such as batterie(s), fuel cell(s), and/or by an engine driven by a generator system.

In some embodiments, tail rotors 108 may utilize variations in rotor speed to control thrust generated by tail rotors 108 in addition to or instead of, the use of collective pitch control of tail rotors 108.

The use of pre-existing aircraft hardware for UAV 300 and/or UAV 1200 reduces the costs, risks, and effort involved in designing, testing, qualifying UAV 300 and/or UAV 1200 for service. This significantly improves the process associated with fielding new UAVs, such as UAV 300 and/or UAV 1200.

Although specific embodiments were described herein, the scope is not limited to those specific embodiments. Rather, the scope is defined by the following claims and any equivalents thereof.

What is claimed is:

1. An Unmanned Aerial Vehicle (UAV), comprising:
a fuselage;
a first tail boom coupler disposed along the fuselage and comprising a first attachment face that opposes a second attachment face;
a second tail boom coupler disposed along the fuselage and comprising a third attachment face that opposes a fourth attachment face; and
a plurality of helicopter tail boom assemblies that act as lift-generating elements for the UAV, wherein each helicopter tail boom assembly of the plurality of helicopter tail boom assemblies is procured from a previously-qualified design configured to compensate for torque generated by a main rotor of a helicopter and re-used in the UAV to generate lift;
wherein each helicopter tail boom assembly of the plurality of helicopter tail boom assemblies comprises a first end and a second end opposite the first end, a tail rotor proximate to the second end, and a tail rotor drive system that includes a drive shaft mechanically coupled with a power source of the UAV and a gearbox that converts rotation of the drive shaft from an axis that is substantially parallel to the helicopter tail boom assembly to a rotation that is substantially perpendicular to the helicopter tail boom assembly;
wherein the plurality of helicopter tail boom assemblies includes:
a first helicopter tail boom assembly coupled to the first attachment face that is designed to mate with the first end of the first helicopter tail boom assembly;
a second helicopter tail boom assembly coupled to the second attachment face that is designed to mate with the first end of the second helicopter tail boom assembly;
a third helicopter tail boom assembly coupled to the third attachment face that is designed to mate with the first end of the third helicopter tail boom assembly; and
a fourth helicopter tail boom assembly coupled to the fourth attachment face that is designed to mate with the first end of the fourth helicopter tail boom assembly.

2. The UAV of claim 1, wherein:
each of the helicopter tail boom assemblies extends perpendicularly from the fuselage.

3. The UAV of claim 1, wherein:
the first tail boom coupler further comprises a first collective pitch system that varies a pitch of the tail rotor for the first helicopter tail boom assembly, and varies a pitch of the tail rotor for the second helicopter tail boom assembly.

4. The UAV of claim 3, wherein:
the second tail boom coupler further comprises a second collective pitch system that varies a pitch of the tail rotor for the third helicopter tail boom assembly, and varies a pitch of the tail rotor for the fourth helicopter tail boom assembly.

5. The UAV of claim 1, wherein:
the first tail boom coupler is configured to rotate the first attachment face to vary a direction of thrust from the tail rotor of the first helicopter tail boom assembly, and to rotate the second attachment face to vary a direction of thrust from the tail rotor of the second helicopter tail boom assembly; and
the second tail boom coupler is configured to rotate the third attachment face to vary a direction of thrust from the tail rotor of the third helicopter tail boom assembly, and to rotate the fourth attachment face to vary a direction of thrust from the tail rotor of the fourth helicopter tail boom assembly.

6. The UAV of claim 1, wherein:
the first helicopter tail boom assembly is coaxial with the second helicopter tail boom assembly along a first axis; and
the third helicopter tail boom assembly is coaxial with the fourth helicopter tail boom assembly along a second axis.

7. The UAV of claim 6, wherein:
the first axis is parallel to the second axis.

8. The UAV of claim 6, wherein:
the tail rotor of the first helicopter tail boom assembly rotates in an opposite direction than the tail rotor of the second helicopter tail boom assembly; and
the tail rotor of the third helicopter tail boom assembly rotates in an opposite direction than the tail rotor of the fourth helicopter tail boom assembly.

9. The UAV of claim 1, wherein each attachment face of the first, second, third, and fourth attachment faces comprises:
a flat surface circular in shape;
a plurality of mounting holes used to mechanically couple a corresponding one of the helicopter tail boom assemblies to the attachment face; and
an interior cutout that enables the drive shaft of the tail rotor drive system to pass through the attachment face.

10. The UAV of claim 1, wherein:
the power source comprises at least one electric motor.

11. A method of fabricating an Unmanned Aerial Vehicle (UAV), the method comprising:
fabricating a fuselage;
fabricating a first tail boom coupler at the fuselage comprising a first attachment face that opposes a second attachment face;
fabricating a second tail boom coupler at the fuselage comprising a third attachment face that opposes a fourth attachment face; and
procuring a plurality of helicopter tail boom assemblies that act as lift-generating elements for the UAV, wherein each helicopter tail boom assembly of the plurality of helicopter tail boom assemblies is procured from a previously-qualified design configured to compensate for torque generated by a main rotor of a helicopter and re-used in the UAV to generate lift;
wherein each helicopter tail boom assembly of the plurality of helicopter tail boom assemblies comprises a first end and a second end opposite the first end, a tail rotor proximate to the second end, and a tail rotor drive system that includes a drive shaft mechanically coupled with a power source of the UAV and a gearbox that converts rotation of the drive shaft from an axis that is substantially parallel to the helicopter tail boom assembly to a rotation that is substantially perpendicular to the helicopter tail boom assembly;
wherein the plurality of helicopter tail boom assemblies includes:
a first helicopter tail boom assembly coupled to the first attachment face that is designed to mate with the first end of the first helicopter tail boom assembly;
a second helicopter tail boom assembly coupled to the second attachment face that is designed to mate with the first end of the second helicopter tail boom assembly;
a third helicopter tail boom assembly coupled to the third attachment face that is designed to mate with the first end of the third helicopter tail boom assembly; and
a fourth helicopter tail boom assembly coupled to the fourth attachment face that is designed to mate with the first end of the fourth helicopter tail boom assembly.

12. The method of claim 11, wherein fabricating the first tail boom coupler comprises:
fabricating a first collective pitch system that varies a pitch of the tail rotor for the first helicopter tail boom assembly, and varies a pitch of the tail rotor for the second helicopter tail boom assembly.

13. The method of claim 12, wherein fabricating the second tail boom coupler comprises:
fabricating a second collective pitch system that varies a pitch of the tail rotor for the third helicopter tail boom assembly, and varies a pitch of the tail rotor for the fourth helicopter tail boom assembly.

14. The method of claim 11, wherein:
fabricating the first tail boom coupler comprises configuring the first attachment face to rotate to vary a direction of thrust from the tail rotor of the first helicopter tail boom assembly, and configuring the second attachment face to rotate to vary a direction of thrust from the tail rotor of the second helicopter tail boom assembly; and
fabricating the second tail boom coupler comprises configuring the third attachment face to rotate to vary a direction of thrust from the tail rotor of the third helicopter tail boom assembly, and configuring the fourth attachment face to rotate to vary a direction of thrust from the tail rotor of the fourth helicopter tail boom assembly.

15. An Unmanned Aerial Vehicle (UAV), comprising:
a fuselage;
a first tail boom coupler attached to the fuselage, and comprising attachment faces that include at least a first attachment face that opposes a second attachment face;
a second tail boom coupler attached to the fuselage, and comprising the attachment faces that include at least a third attachment face that opposes a fourth attachment face; and
a plurality of helicopter tail boom assemblies that act as lift-generating elements for the UAV, wherein each helicopter tail boom assembly of the plurality of helicopter tail boom assemblies is procured from a previously-qualified design configured to compensate for torque generated by a main rotor of a helicopter and re-used in the UAV to generate lift;
wherein each helicopter tail boom assembly of the plurality of helicopter tail boom assemblies comprises a first end and a second end opposite the first end, a tail rotor proximate to the second end, and a tail rotor drive system that includes a drive shaft mechanically coupled with a power source of the UAV and a gearbox that converts rotation of the drive shaft from an axis that is substantially parallel to the helicopter tail boom assembly to a rotation that is substantially perpendicular to the helicopter tail boom assembly;
wherein the attachment faces are each designed to mate to the first end of one of the helicopter tail boom assemblies;
wherein one of the helicopter tail boom assemblies is coupled to each of the attachment faces of the first tail boom coupler and the second tail boom coupler.

16. The UAV of claim 15, wherein:

the plurality of helicopter tail boom assemblies includes a first helicopter tail boom assembly coupled to the first attachment face, and a second helicopter tail boom assembly coupled to the second attachment face; and the UAV further comprises a first collective pitch system that varies a pitch of the tail rotor for the first helicopter tail boom assembly, and a second collective pitch system that varies a pitch of the tail rotor for the second helicopter tail boom assembly.

17. The UAV of claim 15, wherein:

the plurality of helicopter tail boom assemblies includes a first helicopter tail boom assembly coupled to the first attachment face, and a second helicopter tail boom assembly coupled to the second attachment face; and the first tail boom coupler is configured to rotate the first attachment face to vary a direction of thrust from the tail rotor of the first helicopter tail boom assembly, and to rotate the second attachment face to vary a direction of thrust from the tail rotor of the second helicopter tail boom assembly.

18. The UAV of claim 15, wherein:

the power source comprises a plurality of electric motors each coupled with one of the helicopter tail boom assemblies.

19. The UAV of claim 15, wherein:

the power source comprises at least one electric motor.

20. The UAV of claim 15, wherein:

each attachment face of the attachment faces comprises:
 a flat surface circular in shape;
 a plurality of mounting holes used to mechanically couple a corresponding one of the helicopter tail boom assemblies to the attachment face; and
 an interior cutout that enables the drive shaft of the tail rotor drive system to pass through the attachment face.

\* \* \* \* \*